United States Patent [19]

Vincent

[11] 4,204,965
[45] May 27, 1980

[54] SAFETY DEVICE FOR OIL FILTERS AND THE LIKE

[75] Inventor: Rene J. Vincent, Oupeye, Belgium

[73] Assignee: Fabrique Nationale Herstal, en abrégé FN, societe anonyme, Herstal, Belgium

[21] Appl. No.: 17,559

[22] Filed: Mar. 5, 1979

[30] Foreign Application Priority Data

May 9, 1978 [BE] Belgium .................................. 56947

[51] Int. Cl.² .............................................. B01D 35/12
[52] U.S. Cl. .................................................. 210/447
[58] Field of Search .......................... 210/131, 446–448, 210/398, 419, DIG. 14

[56] References Cited

U.S. PATENT DOCUMENTS

| 3,333,696 | 8/1967 | Rosaen | 210/131 X |
| 3,333,697 | 8/1967 | Rosaen | 210/131 X |

Primary Examiner—William A. Cuchlinski, Jr.
Attorney, Agent, or Firm—Bacon & Thomas

[57] ABSTRACT

Safety device for oil filters and the like, having a casing containing a filtering cartridge, wherein a piston is entered with a frictional fit in said casing against a spring means, said piston being forced towards the bottom of the casing into a waiting position by the insertion of said cartridge; at least one oil passage being provided through said piston, said spring means returning the piston in its active position upon removal of the cartridge from the casing and a means being provided for releasably locking said piston in its active position.

7 Claims, 5 Drawing Figures

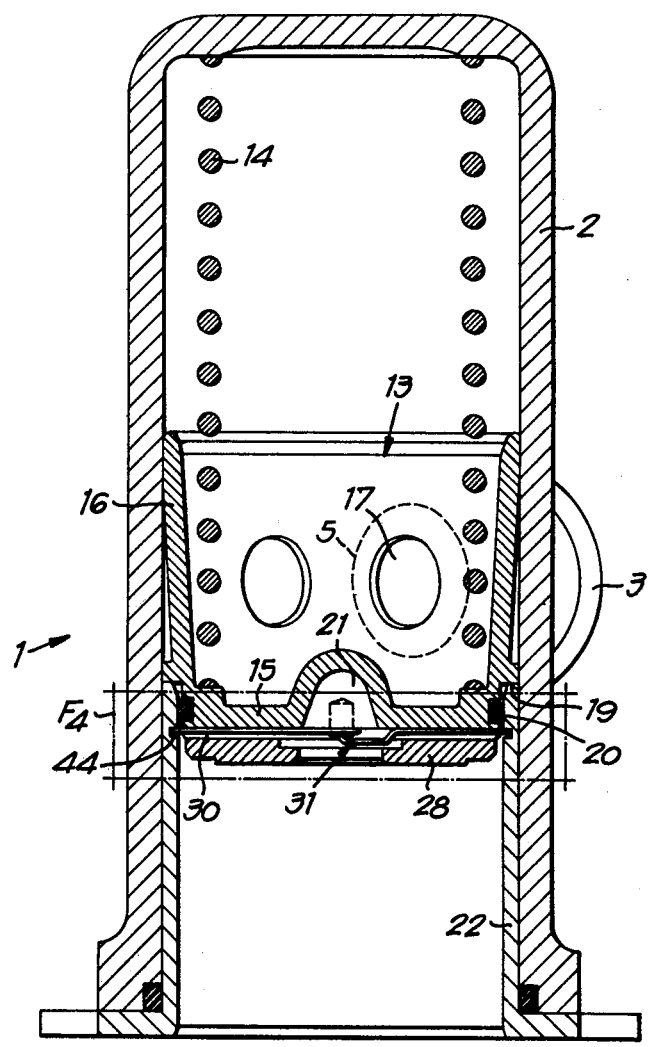

SAFETY DEVICE FOR OIL FILTERS AND THE LIKE

The present invention pertains to a safety device for oil filters and the like.

In a lubrication circuit or the like, it is usual to provide at least one filter cartridge, the latter being periodically cleaned or replaced. Such a cartridge is housed in a casing, fitted in a line and provided with a sealing cover or plug which permits the removal and replacement of the cartridge.

In numerous applications, it is highly desirable to be able systematically and automatically to avoid loss of lubricant when extracting the cartridge, and more particularly still in case of an accidental removal, without interrupting the circuit. This is particularly true for aviation, where the elements aboard may be subjected to considerable accelerations or decelerations, in the most varied directions.

The purpose of the invention is to provide a safety device which permits to obtain the desired result with efficiency.

Such a device consists in substance, according to the invention,, of a piston which frictionally fits in aforesaid casing and is intended to be thrust down towards the bottom of the latter, in a waiting position, on entering the cartridge; at least one passage through aforesaid piston; a means for bringing the piston in active position when the cartridge is removed from the casing, position in which said passage assures the continuance of flow through aforesaid line, whereas the piston prevents all flow out of the casing; a means for locking said piston in its active position.

In order better to stress the characteristics and advantages of the invention, an example of realization of the latter will be described hereinafter as an in no way restrictive illustration, with reference to the appended drawings in which:

FIG. 3 is a similar view of that of FIG. 1, cartridge removed and casing rotated by about 45° about its axis for the sake of clearness of the drawing;

Figure 1:
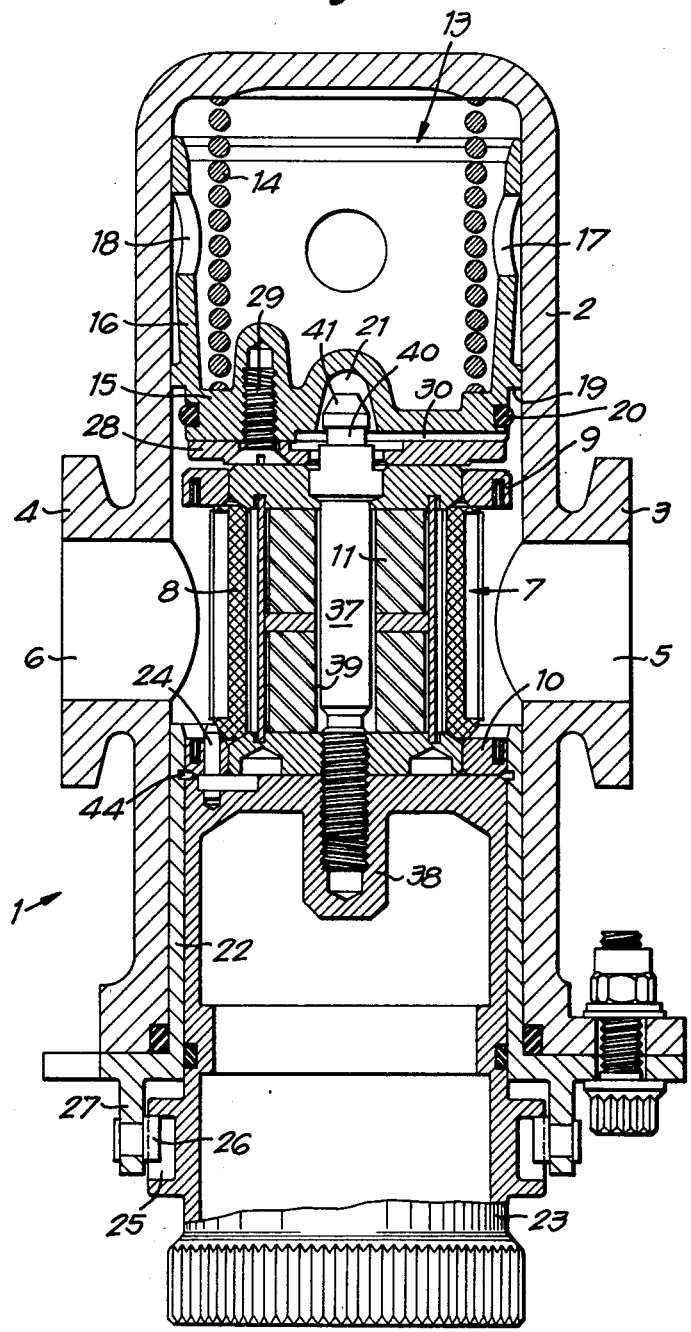
FIG. 1 shows, as axial section, an oil filter fitted with a device according to the invention, in normal operating position.
Figure 2:
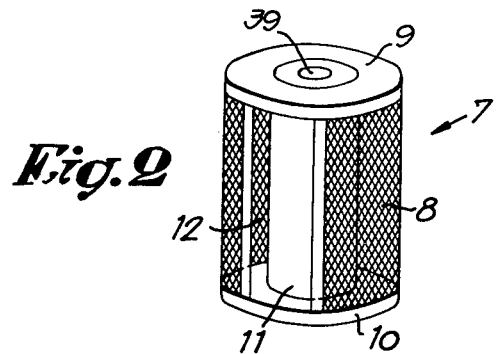
FIG. 2 is a simplified perpective view of the cartridge contained in the filter of FIG. 1.
Figure 4:
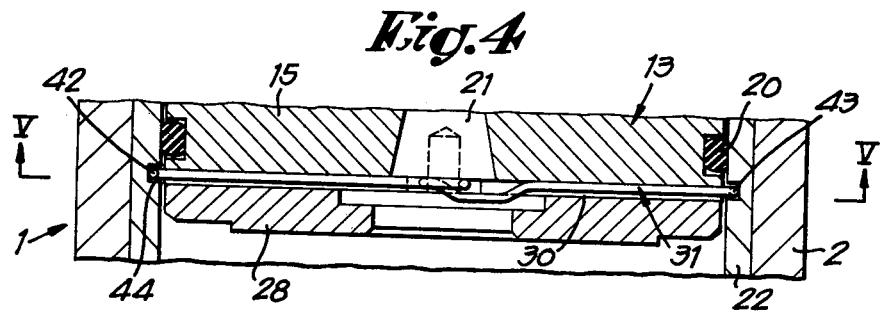
FIG. 4 shows to a larger scale that part of FIG. 3 which is indicated by F4.

In the example shown, filter 1 consists of a casing 2 intended to be fitted in a fluid circuit (not shown) by means of flanges 3 and 4, respectively surrounding an inlet passage 5 and an outlet passage 6, or vice versa.

Casing 2 is provided for receiving a filter cartridge 7, made up of a cylindrical filtering grid 8, maintained between two discs 9 and 10, joined together by a magnetic core 11. Grid 8 is provided with an opening 12 which is intended to be located opposite inlet passage 5. This type of cartridge is well known (magnetic strainer).

The device according to the invention is in this case made up of a piston 13 entered in the bottom of casing 2, with interposition of a helical spring 14. This piston 13 comprises a head 15 and a skirt 16 pierced by at least two diametrically opposite openings, respectively 17 and 18. In the proximity of head 15, skirt 16 is provided with a collar 19, followed by a groove which contains an O type sealing ring 20. Head 15 displays a central cup 21.

A sleeve 22 is provided inside casing 2, between passages 5 and 6 and its opening.

A hollow plug 23, which supports strainer 7 by means of a locating pin 24 is provided with a locking groove 25, intended to incorporate with dowels 26 carried by a lug 27 provided for this purpose on sleeve 22.

When the filter is in active position (FIG. 1), piston 13 is thrust back by disc 9 of strainer 7, towards a waiting position, whereby spring 14 is compressed.

In the case of an intended or accidental removal of strainer 7, piston 13 is pressed into its active position (FIG. 3) by spring 14. In this position, aforesaid collar abuts the edge of sleeve 22, seal 20 being entered into the latter, thus assuring a tight seal. On the other hand, passages 17 and 18 are now opposite aforesaid passages 5 and 6, thus permitting the free circulation of the oil.

It is obviously necessary to lock the piston 13 in this active position, especially in the case of an accidental expulsion of strainer 7 and plug 23.

For this purpose, a plate 28 is attached to the head 15 of the piston by means of a screw 29 (shown only in FIG. 1). This plate 28 together with head 15 encompasses a space 30 in which is fitted a spring 31. The latter comprises a circular arc shaped part 32 which extends over approximately one half of the circumference of head 15 and is extended at both ends by branches 33 and 34 which converge towards the center line of the piston.

Figure 5:
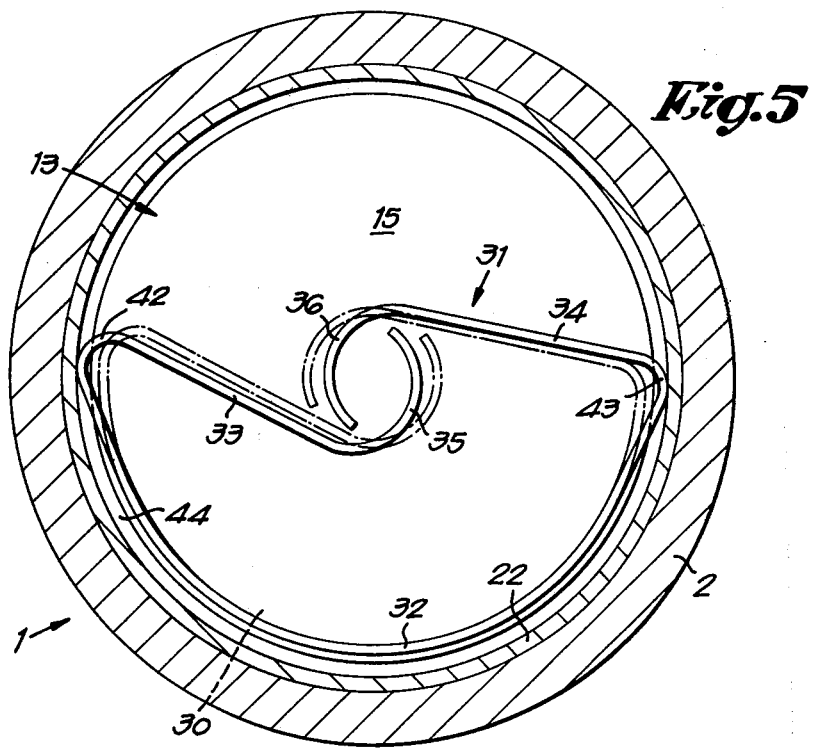
FIG. 5 is a section according to line V—V of FIG. 4.

These branches end up in curved parts, respectively 35 and 36, which between them form an imperfect circle as shown in the sectional view of FIG. 5.

A rod 37, which is screwed in a corresponding part 38 of plug 23, extends through an axial bore 39, provided for this purpose in strainer 7, so as to stand proud of disc 9. This end comprises a groove 40, followed by a truncated cone shaped head 41 which forms the free end of rod 37.

When the filter is in active position (FIG. 1), aforesaid curved ends 35 and 36 or spring 31 are shaped apart from each other by rod 37, being entered in said groove 40. Spring 31 is then completely comprised within space 30 (dash dot line in FIG. 5). In the case of the removal or the expulsion of the strainer 7-plug 23 assembly, rod 37, in a first phase, aids spring 14 to move piston 13 towards its active position. At the latest when this position has been reached, the rod is extracted from between parts 35 and 36, which then move closer together. This permits parts 42 and 43 of spring 31 to protrude from head 15 of the piston and to penetrate in groove 44 provided for this purpose in sleeve 22.

The locking of the piston is thus assured. Its unlocking is performed conversely, when entering a new plug-strainer-rod assembly.

It is obvious that numerous alternations can be brought about to the above-described example, without however going beyond the scope of the invention.

It is, for instance, possible to replace spring 31 by two rigid bolts, stressed towards a retracted position within piston 13 by springs, and which can be thrust out in opposition to the latter into locked position by means of the head 41.

The invention also extends to all filters equipped with a device such as described.

What I claim is:

1. Safety device for oil filters and the like, of the type which consists of a casing fitted in a fluid circuit and provided to receive a filtering cartridge therein, such a casing having a bottom which is opposite to an access opening which can be closed by a cover and which is intended to receive a filtering cartridge which can be entered and removed through aforesaid opening, characterized by the fact that it mainly consists of a piston which is entered with frictional fit in aforesaid casing and is intended to be thrust down towards the bottom of the latter in a waiting position, subsequent to the insertion of the cartridge, at least one passage provided through aforesaid piston; a means for bringing the piston to its active position on removal of the cartridge from the casing, position in which aforesaid passage assures the continuity of flow through aforesaid line, whereas the piston prevents any flow out of the casing, and a means for locking aforesaid piston in its active position.

2. Device according to claim 1, characterized by the fact that aforesaid cartridge is carried by aforesaid cover.

3. Device according to claim 1, characterized by the fact that aforesaid piston comprises a head and a skirt, a pair at least of diametrically opposite openings in the latter which form, together with the internal volume of the skirt, aforesaid passage through the piston.

4. Device according to claim 1, characterized by the fact that aforesaid locking means consists of a spring fitted within the piston and capable of being either completely comprised within the latter, or of protruding at least in two places from the cylindrical surface thereof, so as to penetrate in a groove provided for this purpose in the casing.

5. Device according to claim 4, characterized by the fact that aforesaid spring is sunk in aforesaid head by the action of a rod which is carried by aforesaid cover and which passes axially through aforesaid cartridge.

6. Device according to any one of the previous claims, characterized by the fact that a sleeve, entered in the casing, prevents the piston from moving beyond its active position.

7. Any filter equipped with the device according to any of the claims 1 to 6.

* * * * *